Dec. 14, 1954 C. E. LOMAX 2,697,133

AUTOMATIC TELEPHONE SYSTEM OF THE MEASURED-SERVICE TYPE

Filed Jan. 21, 1953 2 Sheets-Sheet 1

INVENTOR.
Clarence E. Lomax
BY
Smith, Olsen & Baird
Attys.

Dec. 14, 1954 C. E. LOMAX 2,697,133

AUTOMATIC TELEPHONE SYSTEM OF THE MEASURED-SERVICE TYPE

Filed Jan. 21, 1953 2 Sheets-Sheet 2

INVENTOR.
Clarence E. Lomax
BY
Smith, Olsen & Baird
Attys.

United States Patent Office 2,697,133

Patented Dec. 14, 1954

2,697,133

AUTOMATIC TELEPHONE SYSTEM OF THE MEASURED-SERVICE TYPE

Clarence E. Lomax, Chicago, Ill., assignor to Automatic Electric Laboratories, Inc., Chicago, Ill., a corporation of Delaware Application January 21, 1953, Serial No. 332,344

6 Claims. (Cl. 179—7.1)

The present invention relates to automatic telephone systems of the measured-service type.

It is the general object of the present invention to provide in an automatic telephone system of the type noted, an improved and flexible arrangement for selectively assessing charges against calling subscriber lines dependent upon the traffic conditions in the office terminating the subscriber lines so as to bring about a more economical utilization of the automatic switching links therein.

Another object of the invention is to provide a charge assessing arrangement of the character noted, that includes a master controller having light and medium and heavy traffic settings and that selectively determines in accordance with the traffic setting thereof whether or not a special charge is to be assessed against a calling subscriber line for a completed connection, and if a special charge is to be assessed, whether or not the special charge is to be assessed upon a basis of the mere completion of the extended connection or upon a basis of a holding time interval of the completed connection.

A further object of the invention is to provide a charge accessing arrangement of the character noted, wherein the master controller is clock-governed so that the light and medium and heavy traffic settings thereof correspond to particular clock times.

Further features of the invention pertain to the particular arrangement of the circuit elements of the telephone system, whereby the above-outlined and additional operating features thereof are attained.

Figure 1:
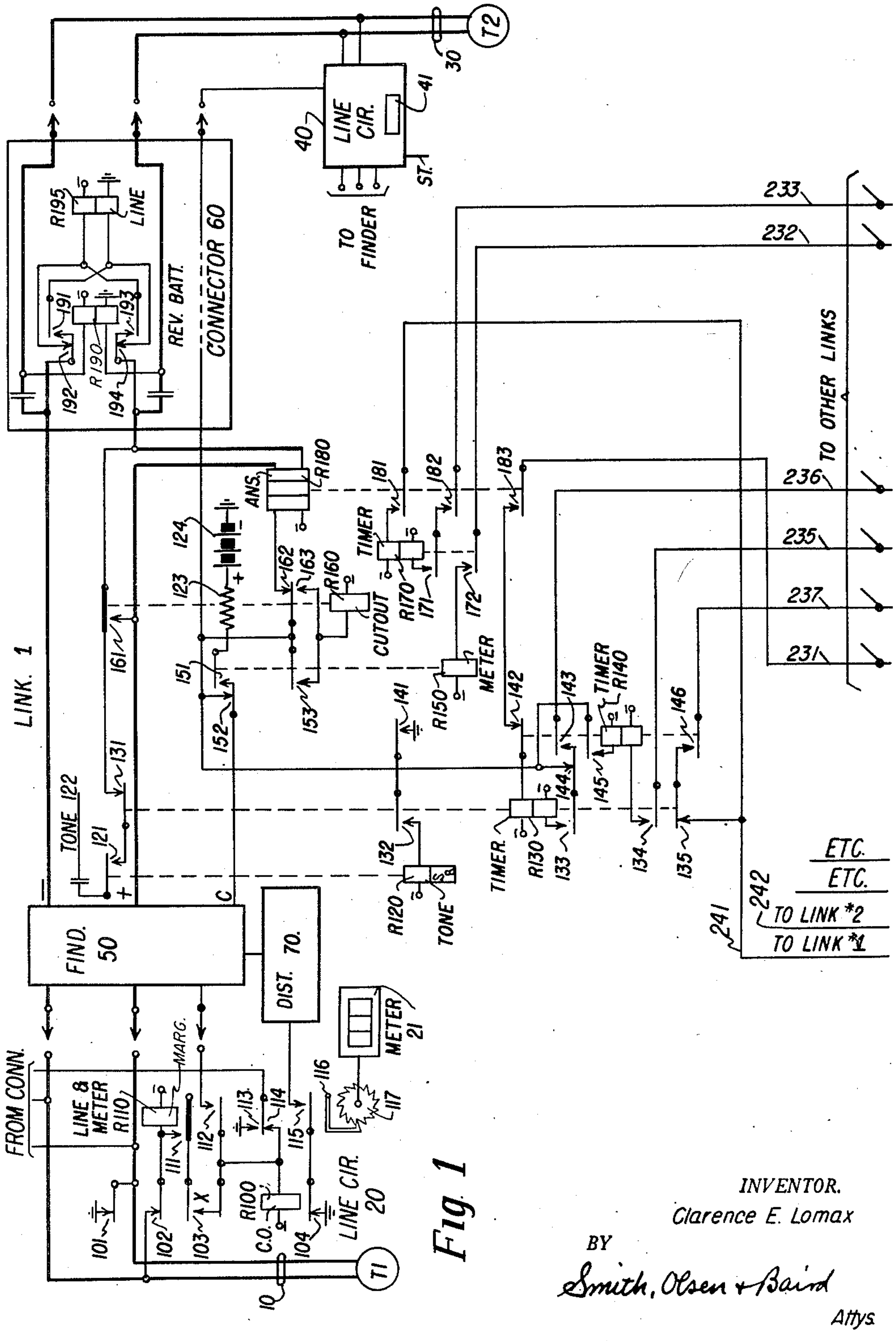
Figure 2:
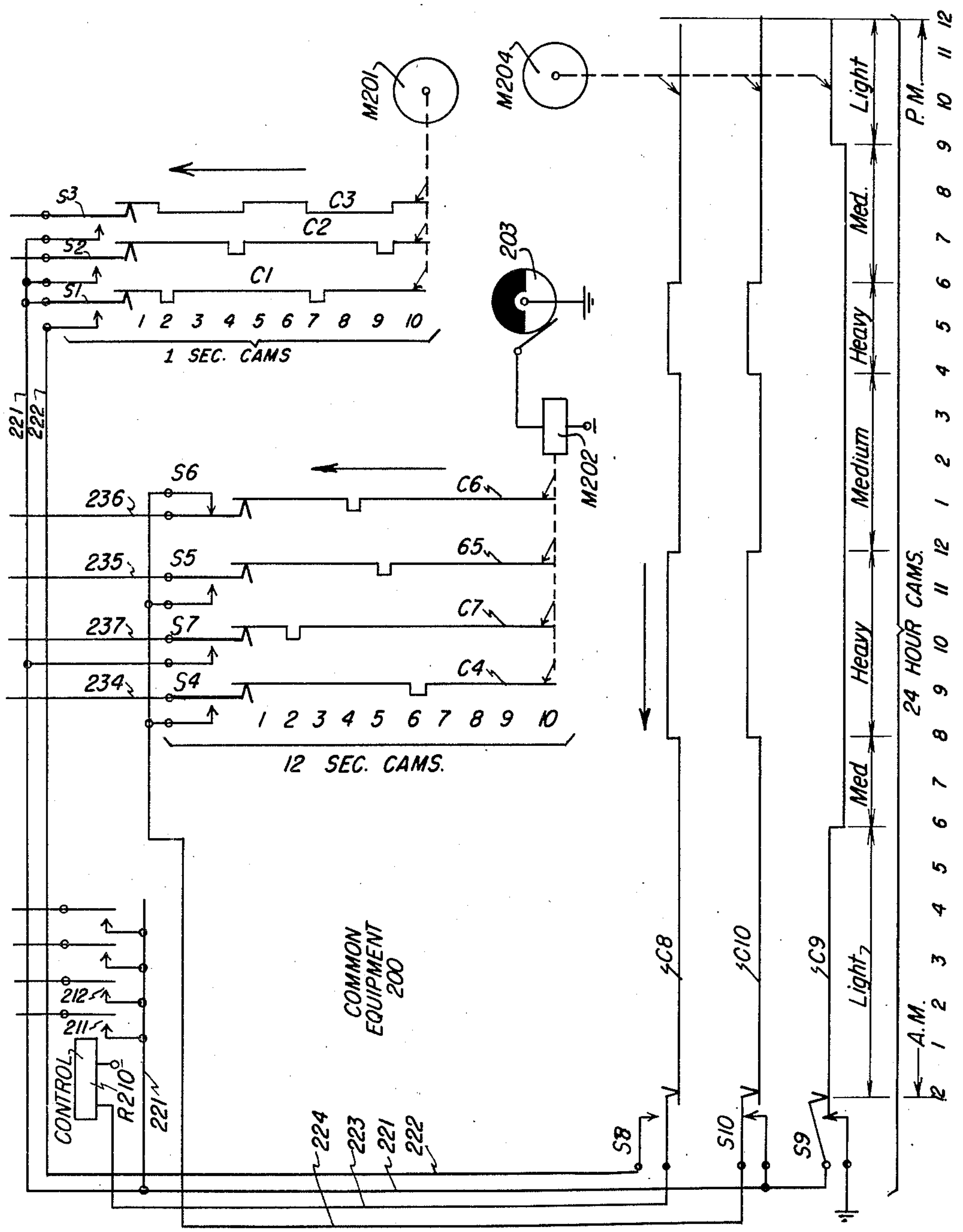

The invention, both as to its organization and method of operation, together with further objects and advantages thereof will best be understood by reference to the following specification taken in connection with the accompanying drawings, in which Figures 1 and 2, taken together, illustrate the details of an automatic telephone system of the measured-service type embodying the present invention. In order to form a unified diagram Figs. 1 and 2 should be arranged lengthwise in adjacent respective upper and lower positions.

Referring now more particularly to the drawings, there is illustrated an automatic telephone system of the measured-service type having incorporated therein the features of the present invention, and comprising an office or exchange serving a number of subscriber substations, including the subscriber substations T1 and T2. Each subscriber substation T1, T2, etc., is provided with conventional subscriber substation equipment, including a telephone instrument, a dial and a ringer; and the subscriber substations T1, T2, etc., are arranged on individual subscriber lines 10, 30, etc., that are provided with individual line circuits 20, 40, etc. Each of the line circuits may be identical to the line circuit 20 that comprises a cutoff relay R100, a line and meter relay R110 and a meter 21 capable of totalizing the number of individual charges or calls that are to be assessed against the individual subscriber substation T1.

Also the office comprises a plurality of automatic switching links, each including a finder and a connector; link No. 1 is illustrated and includes a finder 50 and a connector 60. The finder 50 is of conventional Strowger type, and the connector 60 is of conventional Strowger type including a relay group, the reverse battery relay R190 and the line relay R195 being illustrated. Also link No. 1 comprises a relay group including a tone relay R120, three timer relays R130, R140 and R170, a meter relay R150, a cutout relay R160 and an answer relay R180. Also, the office comprises an exchange battery of 48-volts direct current, the positive terminal of which is grounded, as well as a booster battery of 48-volts, the negative terminal of which is grounded. Further, a distributor 70, of any conventional type, is operatively associated with the links No. 1, etc., and with the various line circuits 20, 40, etc.

Finally, the office comprises common equipment 200 that includes a control relay R210, three one-second cams C1, C2 and C3, four twelve-second cams C4, C5, C6 and C7, and three twenty-four-hour cams C8, C9 and C10. In the arrangement, the one-second cams C1, C2 and C3 are continuously rotated by an associated motor M201 of any suitable type; and the twenty-four-hour cams C8, C9 and C10 are continuously rotated by an associated motor M204 of any suitable type. On the other hand, the twelve-second cams C4, C5, C6 and C7 are stepped intermittently by an associated motor M202 that may be of the pawl and ratchet type, that, in turn, is operated by an associated impulsing cam 203. Thus, it will be understood that the one-second cams C1, C2 and C3 are rotated one complete revolution each second; while the twenty-four-hour cams C8, C9 and C12 are rotated one complete revolution each 24 hours. On the other hand, the twelve-second cams C4, C5, C6 and C7 are rotated ten steps, constituting one complete revolution, each twelve-seconds. In Fig. 2, the various cams C1 to C10, inclusive, are shown in longitudinal developed relation for purpose of illustration; whereas they are in fact ordinarily made in disk-like form. The configuration of the one-second cams C1, C2 and C3 and the twelve-second cams C4, C5, C6 and C7 will be described in more detail hereinafter; whereas the configuration of the twenty-four-hour cams C8, C9 and C10 are related to the traffic conditions of the office illustrated on a time-basis. More particularly, it is assumed that in this office the time interval between 9 p. m. and 6 a. m. corresponds to a light traffic condition therein; that the time intervals between 6 a. m. and 8 a. m. and between 12 m. and 4 p. m. and between 6 p. m. and 9 p. m. correspond to a medium traffic condition therein; and that the time intervals between 8 a. m. and 12 m. and between 4 p. m. and 6 p. m. correspond to a heavy traffic condition therein. Further, it is contemplated that the twenty-four-hour cams C8, C9 and C10 are set in exact accordance with the traffic conditions in the particular office illustrated, and that they will be adjusted in any suitable manner should the traffic conditions in this office subsequently vary substantially from that employed in the initial setting thereof.

Further, the common equipment 200 comprises ten control switches S1 to S10, inclusive, respectively individually associated with the cams C1 to C10, inclusive. The control switches S2, S3, S4, S5, S6 and S7 respectively terminate common control conductors 232, 233, 234, 235, 236 and 237 that are multipled to the various links No. 1, etc., for metering control purposes, as explained more fully hereinafter. Also, the control relay R210 is provided with individual contacts 211, 212, etc., respectively terminating control conductors 241, 242, etc., respectively extending to the links No. 1, No. 2, etc., that are employed for metering control purposes, as explained more fully hereinafter. Finally, in the common equipment 200, the direction of movement of the cams C1 to C3, inclusive, as a unit, is indicated as being upwardly; the direction of movement of the cams C4 to C7, inclusive, as a unit, is indicated as being upwardly; and the direction of movement of the cams C8 to C10, inclusive, as a unit, is indicated as being to the left.

A better understanding of the connection and arrangement of the apparatus incorporated in the telephone system will be facilitated from a consideration of the extension of various calls in the office illustrated during the various time intervals mentioned.

Considering now the setting up of a telephone call in the office illustrated, during a time interval of a light traffic condition therein (9 p. m. to 6 a. m.), the twenty-four-hour cams C8, C9 and C10 operate the control switches S8, S9 and S10 into the positions illustrated, the control switches S8 and S9 being open and the control switch S10 being closed. At this time, it may also be assumed that a call is to be extended from the subscriber substation T1 to the subscriber substation T2; whereby the call is first initiated at the calling subscriber substation T1 effecting operation of the line and meter relay R110 in the individually associated line circuit 20 over the associated subscriber line 10. Upon operating the line and meter relay R110 interrupts, at the contacts 114, the normal path for applying battery potential via the winding of the cutoff relay R100 to the control conductor extending from the connectors having access thereto; and completes, at the contacts 113, a path for applying ground potential to the control conductor mentioned; whereby the calling subscriber line 10 is marked as busy to the connectors mentioned. Also the line and meter relay R110 completes, at the contacts 112, a path for applying battery potential via the winding of the cutoff relay R100 to the control conductor extending to the finders having access thereto; and completes, at the contacts 115, a path for applying ground potential to the start conductor extending to the distributor 70. At this point, it is noted that this operation of the line meter relay R110 does not actuate its armature 116 carrying the pawl associated with the ratchet wheel 117 of the individually associated meter 21, the line and meter relay R110 being of the marginal type and operative through a complete step for metering purposes, as explained more fully hereinafter. The distributor 70 operates to assign an idle one of the links, such, for example, as link No. 1; whereby the finder 50 thereof operates to find the calling subscriber line 10 and then switches through to complete a loop circuit between the calling subscriber substation T1 and the line relay R195 in the connector 60 so as to effect seizure thereof.

Upon seizure of the connector 60 ground potential is applied to the control conductor extending back to the finder 50 and consequently to complete a circuit, including the contacts 112, for operating the cutoff relay R100. Upon operating the cutoff relay R100 first completes, at the contacts 103, a multiple holding circuit, also including the contacts 111 and 112, for energizing the winding of the line and meter relay R110 so as to retain the latter relay in its operated position. Also the cutoff relay R100 interrupts, at the contacts 101 and 102, the normal connections between the winding of the line and meter relay R110 and the line conductors of the subscriber line 10 so as to free the calling subscriber line 10 of attachments at this time. Finally, the cutoff relay R100 interrupts, at the contacts 104, the path for applying ground potential to the start conductor extending to the distributor 70 so as to dismiss the distributor 70 at this time rendering it free to the use of any other calling subscriber line in the office illustrated.

The subscriber at the calling subscriber substation T1 then dials the two digits comprising the directory number of the called subscriber substation T2 so as to effect operation of the connector 60 in a conventional manner to select the called subscriber line 30 extending to the called subscriber substation T2. At this time, the connector 60 also operates in a conventional manner to test the idle or busy condition of the called subscriber line 30 as marked thereto by the individually associated line circuit 40; and it may be assumed that the called subscriber line 30 is idle at this time so that the connector 60 operates to project ringing current over the called subscriber line 30 and to return ring-back tone current over the connection including the calling subscriber line 10. When the subscriber at the called subscriber substation T2 answers the call the reverse battery relay R190 is operated to effect reversal, at the contacts 191, 192, 193 and 194, of the polarity of the loop circuit extending between the calling subscriber substation T1 and the line relay R195. Also, at this time, ground potential in the connector 60 is applied via a path, not shown, to the control conductor extending between the finder 50 and the connector 60 so as to complete a circuit including the contacts 162, for energizing the left-hand winding of the answer relay R180 so as to polarize the latter relay to operate incident to the reversal of the polarity of the loop circuit extending between the calling subscriber substation T1 and the line relay R195, as described above. Also this application of ground potential upon the control conductor mentioned extending between the finder 50 and the connector 60 retains the finder 50 in its operated position and retains the line circuits 20 and 40 in their operated condition, as described above. More particularly, the right-hand winding of the answer relay R180 is included in the positive line conductor extending between the finder 50 and the connector 60 and included in the loop circuit extending between the calling subscriber substation T1 and the line relay R195 in the connector 60; whereby the answer relay R180 is operated at this time incident to the reversal of polarity of the loop circuit mentioned. Upon operating, the answer relay R180 prepares, at its contacts 181, etc., certain circuits that are employed for metering purposes during medium and heavy traffic conditions in the office illustrated; which circuits are not controlled in the present instance by virtue of the completion of the present connection between the calling subscriber substation T1 and the called subscriber substation T2 during a time interval corresponding to a light traffic condition in the office illustrated. Accordingly, at this time, an established connection is completed between the calling subscriber substation T1 and the called subscriber substation T2; and no metering is effected, since the present call was completed during a light traffic condition in the office illustrated, as noted above.

At the conclusion of the conversation, the subscribers at the calling subscriber substation T1 and at the called subscriber substation T2 disconnect so that the line relay R195 in the connector 60 restores effecting the release of the finder 50 and the connector 60 in a conventional manner and so that the answer relay R180 is restored. At this time, ground potential is removed from the control conductor extending between the finder 50 and the connector 60, so that the line circuits 20 and 40 are returned into their normal idle conditions again marking the subscriber lines 10 and 30 as idle to the connectors having access thereto. Particularly, the cutoff relay R100 in the line circuit 20 restores again completing, at the contacts 101 and 102, the normal connections between the winding of the line and meter relay R110 and the line conductors of the subscriber line 10. Also the line and meter relay R110 restores interrupting, at the contacts 113, the path for applying ground potential to the control conductor extending to the connectors; and recompleting, at the contacts 114, the normal connection between the winding of the cutoff relay R100 and the control conductor mentioned. Thus, the line circuit 20 again marks the subscriber line 10 as idle to the connectors having access thereto. At this time, all of the apparatus involved in the established connection is completely released and available for further use.

Considering now the setting up of a telephone call in the office illustrated, during a time interval of a medium traffic condition therein (6 a. m. to 8 a. m., 12 m. to 4 p. m. and 6 p. m. to 9 p. m.), the twenty-four-hour cams C8, C9 and C10 respectively operate the control switches S8, S9 and S10, the control switch S8 being open and the control switches S9 and S10 being closed. At this time, it may again be assumed that a call is to be extended from the subscriber substation T1 to the subscriber substation T2; whereby the call is initiated at and extended from the calling subscriber substation T1, in the manner described above; and again it may be assumed that the link No. 1 is employed and that the called subscriber substation T2 is idle so that when the subscriber thereat answers the call effecting operation of the reverse battery relay R190 in the connector 60 and the consequent operation of the answer relay R180 in the link No. 1, in the manner described above. Upon operating, the answer relay R180 again prepares, at its contacts 181, etc., the connections between the link No. 1 and the common equipment 200 that are employed for metering purposes.

Shortly following the completion of the connection between the calling subscriber substation T1 and the called subscriber substation T2 and the operation of the answer relay R180, the twelve-second cam C4 momentarily closes and again opens the control switch S4 causing an impulse of ground potential to be transmitted over the control conductor 234, the path including the conductor 224, the closed control switch S10, the conductor 221 and the closed control switch S9. This impulse of ground potential transmitted over the control conductor 234 completes a circuit, including the contacts 183 and 142, for energizing the upper winding of the timer relay R130 causing the latter relay to operate. Upon operating, the timer relay R130 completes, at the contacts 133, a holding circuit, including the contacts 144, and the grounded control conductor extending between the finder 50 and the connector 60, for energizing the lower winding thereof; whereby the timer relay R130 is retained in its operated position following the termination of the impulse of ground potential transmitted over the control conductor 234. Also, the timer relay R130 prepares, at the contacts 134, a circuit for energizing the lower winding of the timer relay R140.

Nine steps or 108 seconds following the operation of the control switch S4 by the twelve-second cam C4, the twelve-second cam C5 momentarily closes and again opens the control switch S5, causing an impulse of ground potential to be transmitted over the control conductor 235; whereby this impulse of ground potential transmitted over the control conductor 235 completes a circuit, including the contacts 134, for energizing the lower winding of the timer relay R140 causing the latter relay to operate. Upon operating the timer relay R140 completes, at the contacts 145, a holding circuit, including the grounded control conductor extending between the finder 50 and the connector 60 for energizing the upper winding thereof; whereby the timer relay R140 is retained in its operated position following the termination of the impulse of ground potential transmitted over the control conductor 234. Also upon operating, the timer relay R140 interrupts, at the contacts 142, a further point in the circuit for energizing the upper winding of the timer relay R130; completes, at the contacts 143, an alternative holding circuit, including the grounded control conductor 236, for energizing the lower winding of the timer relay R130; interrupts, at the contacts 144, the initial holding circuit for energizing the lower winding of the timer relay R130; and prepares, at the contacts 146, a point in a circuit traced hereinafter for energizing the upper winding of the timer relay R170. Finally, the timer relay R140 completes, at the contact 141, a circuit, including the contacts 132, for operating the tone relay R120.

Nine steps or 108 seconds following the operation of the control switch S5 by the twelve-second cam C5, the twelve-second cam C6 momentarily opens and again closes the control switch S6, causing a momentary removal of ground potential from the control conductor 236 so as to interrupt the alternative holding circuit for energizing the lower winding of the timer relay R130; whereby the latter relay restores. Upon restoring, the timer relay R130 interrupts, at the contacts 133, a further point in the alternative holding circuit for energizing the lower winding thereof; interrupts, at the contacts 134, a further point in the circuit for energizing the lower winding of the timer relay R140; and completes, at the contacts 135, a connection between the control conductor 237 and the control conductor 241 so as to prepare a further point in the circuit for energizing the upper winding of the timer relay R170. Also, the timer relay R130 completes, at the contacts 131, a connection, including the contacts 121 and the associated condenser between the tone conductor 122 and the positive line conductor extending between the finder 50 and the connector 60; whereby warning tone is returned over the calling subscriber line 10 for the purpose of indicating to the subscriber at the calling subscriber substation T1 that unless the present connection is terminated within the next 96 seconds that a special charge will be assessed. Finally, the timer relay R130 interrupts, at the contacts 132, the circuit for energizing the winding of the tone relay R120 so as to cause the latter relay to restore shortly thereafter, it being of the slow-to-release type. Upon restoring, the tone relay R120 interrupts, at the contacts 121, the connection between the tone conductor 122 and the positive line conductor extending between the finder 50 and the connector 60; whereby the warning tone previously mentioned is transmitted in the form of a splash of short time duration over the subscriber line 10 to the calling subscriber substation T1 for the purpose noted.

Eight steps or 96 seconds following the operation of the control switch S6 by the twelve-second cam C6, the twelve-second cam C7 momentarily closes and again opens the control switch S7, causing an impulse of ground potential to be transmitted over the control conductor 237. This impulse of ground potential transmitted over the control conductor 237 completes a circuit, including the contacts 146, 135 and 181, for energizing the upper winding of the timer relay R170 in order to cause the latter relay to operate. Upon operating, the timer relay R170 prepares, at the contacts 171, a holding circuit for energizing the lower winding thereof via the control conductor 233; and prepares, at the contacts 172, a circuit for operating the meter relay R150. In the operating cycle of the one-second cam C3, the control switch S3 is closed and then opened after a time interval of about 0.30 second, thereby transmitting a corresponding ground impulse over the control conductor 233 for the purpose of completing the holding circuit for energizing the lower winding of the timer relay R170. Also, in the operating cycle of the one-second cam C2, the control switch S2 is closed and then opened after a time interval of about 0.05 second, thereby transmitting a corresponding ground impulse over the control conductor 232 for the purpose of operating the meter relay R150. The ground impulse transmitted over the control conductor 232 is within the time interval of the ground impulse transmitted over the control conductor 233; whereby operation of the meter relay R150 while the timer relay R170 occupies its operated position is insured. Upon operating, the meter relay R150 completes, at the contacts 151, a path, including the resistor 123, for connecting the booster battery 124 to the control conductor extending back to the finder 50; and interrupts, at the contacts 152, the normal connection between the two portions of the control conductor respectively extending to the finder 50 and to the connector 60. Accordingly, the booster battery potential from the booster battery 124 is applied via the resistor 123 and the contacts 151, as well as the contacts 112, 103 and 111, to the winding of the line and meter relay R110 in the line circuit 20 individual to the subscriber line 10; whereby a voltage of 96 volts is applied across the winding of the line and meter relay R110 causing the latter relay to operate completely since it is of the marginal type. When the line and meter relay R110 thus operates, it actuates its armature 116 operating the meter 21 in the line circuit 20 individual to the calling subscriber line 10 so as to register a unit charge thereagainst.

Also the meter relay R150 completes, at the contacts 153, a circuit, including the grounded control conductor extending back to the connector 60, for operating the cutout relay R160. Upon operating, the cutout relay R160 completes, at the contacts 163, a multiple holding circuit for energizing the winding thereof; interrupts, at the contacts 162, the circuit for polarizing the left-hand winding of the answer relay 180; and completes, at the contacts 161, a path for short-circuiting the right-hand winding of the answer relay R180. Accordingly, the answer relay R180 restores, interrupting, at the contacts 181 and 182, the connections to the upper and lower windings of the timer relay R170 so as to cause the latter relay to restore. Upon restoring, the timer relay R170 interrupts, at the contacts 172, the circuit for retaining operated the meter relay R150. Upon restoring, the meter relay R150 recompletes, at the contacts 152, the connection between the two sections of the control conductor respectively extending to the finder 50 and to the connector 60; and interrupts, at the contacts 151, the path for applying booster battery potential to the section of the control conductor extending to the finder 50. Accordingly, at this time, the line and meter relay R110 restores back to its normal operated position releasing its armature 116, but retaining operated its contacts 111, 112, 113 and 115.

In view of the foregoing, it will be understood that during the medium traffic condition in the office illustrated, a special charge is assessed against a calling subscriber substation for the completion of a telephone connection only in the event the telephone connection is held for a time interval of 312 seconds or somewhat in excess of 5 minutes. Moreover, as noted above, at the conclusion of 216 seconds, the splash of warning tone is returned over the calling subscriber line to the calling subscriber substation warning the subscriber thereat that the charge mentioned will be made 96 seconds later. This arrangement including the splash of warning tone that is transmitted to the calling subscriber substation has a tendency to cause subscribers at calling subscriber substations to hold connections during the medium traffic condition in the office illustrated to time intervals within 5 minutes, thereby freeing more frequently the switchtrain for use of other calling subscriber substations during the medium traffic condition mentioned. Further, it will be appreciated that only one charge is made against the calling subscriber line involved in the established telephone connection in excess of about 5 minutes by virtue of the operated position of the cutout relay R160 in the link No. 1.

At the conclusion of the established connection, the subscriber at the calling and called subscriber substations T1 and T2 again disconnect bringing about the release of the link No. 1 and the return of the line circuits 20 and 40 to their normal idle conditions. In this case, the release of the link No. 1 is the same as that previously described except that in addition the removal of ground potential from the control conductor extending between the finder 50 and the connector 60 interrupts the holding circuit for retaining operated the cutout relay R160 and the holding circuit for energizing the upper winding of the timer relay R140 so that all of the relays in the link No. 1 are returned to their normal restored positions.

Considering now the setting up of a telephone call in the office illustrated during a time interval of a heavy traffic condition therein (8 a. m. to 12 m., and 4 p. m. to 6 p. m.), the twenty-four hour cams C8, C9 and C10 respectively operate the control switches S8, S9 and S10, the control switches S8 and S9 being closed and the control switch S10 being open. At this time, it may again be assumed that a call is to be extended from the subscriber substation T1 to the subscriber substation T2; whereby the call is initiated at and extended from the calling subscriber substation T1 in the manner described above; and again, it may be assumed that the link No. 1 is employed and that the called subscriber substation T2 is idle so that when the subscriber thereat answers the call operation of the reverse battery relay R190 in the connector 60 takes place and the consequent operation of the answer relay R180 in the link No. 1 is brought about, in the manner described above. Upon operating, the answer relay R180 prepares, at the contacts 181, an alternative circuit for energizing the upper winding of the timer relay R170.

In the operating cycle of the one-second cam C1, the control switch S1 is momentarily closed and again opens twice each second, the control switch S1 remaining in its closed position about 0.05 second. Each time the control switch S1 is operated into its closed position, the conductors 221 and 222 are connected together; whereby there is completed a circuit, also including the closed control switch S9, the closed control switch S8 and the conductor 223 for operating the control relay R210 in the common equipment 200; whereby the control relay R210 operates and restores twice each second completing and then interrupting, at the contacts 211, 212, etc., paths for applying ground potential to the control conductors 241, 242, etc., respectively extending to link No. 1, link No. 2, etc. The momentary application of ground potential to the control conductor 241 completes the previously-mentioned alternative circuit, including the contacts 181, for energizing the upper winding of the timer relay R170 in order to cause the latter relay to operate. Upon operating, the timer relay R170 completes, at the contacts 171, the previously traced holding circuit for energizing the lower winding thereof; and prepares, at the contacts 172, the previously traced circuit for operating the meter relay R150. Shortly following this operation of the timer relay R170, as a consequence of the operation of the control relay R210 in the common equipment 200, the one-second cam C2 brings about the transmission of the impulse of ground potential over the control conductor 232 so as to effect operation of the meter relay R150 and the consequent operation of the cutout relay R160 followed by the restoration of the answer relay R180 and the consequent sequential restoration of the timer relay R170 and the meter relay R150; all in the manner previously explained. This operation and subsequent restoration of the meter relay R150 brings about the previously-described complete marginal operation of the line and meter relay R110 in the line circuit 120; whereby the meter 21 therein is operated to assess a unit charge against the individually associated calling subscriber line 10. The subsequent release of the established connection is substantially identical to that previously described.

In view of the foregoing, it will be understood that very shortly following the completion of a telephone connection during the heavy traffic condition in the office illustrated, a unit charge is assessed against the calling subscriber substation without reference to the holding of the established telephone connection for any particular time interval beyond the minimum very small time interval required to bring about operation of the meter 21, as described above. Accordingly, the arrangement effects the assessment of a special charge against a calling subscriber substation substantially immediately incident to the answer at the called subscriber substation, which arrangement again tends to discourage the extension of connections during the heavy traffic condition in the office illustrated; which, of course, tends to distribute the traffic load from the heavy traffic condition into the medium and light traffic conditions in a highly desirable manner, with reference to the total number of links required in the office illustrated for the purpose of accommodating the setting up of the telephone connections during the heavy traffic condition therein.

In view of the foregoing, it is apparent that there has been provided an automatic telephone system of the measured-service type embodying an improved arrangement for rendering free local calls to calling subscriber substations during light traffic conditions in the office, for assessing special charges against the calling subscriber substations only in the event that the established telephone connections are held for a predetermined relatively long time interval during medium traffic conditions in the office, and for assessing special charges against the calling subscriber substations substantially immediately upon answering of the calls at the called subscriber substations during heavy traffic conditions in the office.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In an automatic telephone system including a plurality of subscriber lines, a corresponding plurality of meters respectively individually associated with said subscriber lines, and a number of switching links for setting up connections from calling ones of said subscriber lines; an impulse sender common to said links and normally operative to send thereto timed impulses; a master controller common to said links and having light and medium and heavy traffic settings; means for selectively operating said master controller into different ones of its traffic settings; means governed by said master controller in its light traffic setting for blocking operation of said impulse sender to send timed impulses to said links; each of said links comprising an answer relay operative in response to the completion of a connection thereover from a connected calling one of said subscriber lines, a meter relay operative to operate the one of said meters individually associated with said connected calling one of said subscriber lines, counting mechanism, means governed jointly by said master controller in its medium traffic setting and by operation of said answer relay for operating said counting mechanism to count the timed impulses sent from said impulse sender, means governed by operation of said counting mechanism to count a fixed number of the timed impulses sent from said impulse sender for operating said meter relay upon the next timed impulse sent from said impulse sender, and means governed jointly by said master controller in its heavy traffic setting and by operation of said answer relay for operating said meter relay upon the next timed impulse sent from said impulse sender.

2. The telephone system set forth in claim 1, wherein said means for selectively operating said master controller is clock-governed so that said light and medium and heavy traffic settings of said master controller respectively correspond to particular clock times.

3. The telephone systems set forth in claim 1, wherein said counting mechanism consists essentially of a series of sequentially operated relays.

4. In an automatic telephone system including a plurality of subscriber lines, a corresponding plurality of meters respectively individually associated with said subscriber lines, and a number of switching links for setting up connections from calling ones of said subscriber lines; an impulse sender common to said links and normally operative to send thereto timed impulses; a master controller common to said links and having light and medium and heavy traffic settings; means for selectively operating said master controller into different ones of its traffic settings; means governed by said master controller in its light traffic setting for blocking operation of said impulse sender to send timed impulses to said links;

each of said links comprising an answer relay operative in response to the completion of a connection thereover from a connected calling one of said subscriber lines, a meter relay operative to operate the one of said meters individually associated with said connected calling one of said subscriber lines, counting mechanism, means governed jointly by said master controller in its medium traffic setting and by operation of said answer relay for operating said counting mechanism to count the timed impulses sent from said impulse sender, means governed by operation of said counting mechanism to count a fixed number of the timed impulses sent from said impulse sender for operating said meter relay upon the next timed impulse sent from said impulse sender, means governed jointly by said master controller in its heavy traffic setting and by operation of said answer relay for operating said meter relay upon the next timed impulse sent from said impulse sender, a cutout relay operative to prevent further operation of said meter relay, and means controlled by operation of said meter relay for operating said cut out relay.

5. In an automatic telephone system including a plurality of subscriber lines, a corresponding plurality of meters respectively individually associated with said subscriber lines, and a number of switching links for setting up connections from calling ones of said subscriber lines; an impulse sender common to said links and normally operative to send thereto timed impulses; a master controller common to said links and having light and medium and heavy traffic settings; means for selectively operating said master controller into different ones of its traffic settings; means governed by said master controller in its light traffic setting for blocking operation of said impulse sender to send timed impulses to said links; each of said links comprising an answer relay operative in response to the completion of a connection thereover from a connected calling one of said subscriber lines, a meter relay operative to operate the one of said meters individually associated with said connected calling one of said subscriber lines, counting mechanism, means governed jointly by said master controller in its medium traffic setting and by operation of said answer relay for operating said counting mechanism to count the timed impulses sent from said impulse sender, means governed by operation of said counting mechanism to count a first fixed number of the timed impulses sent from said impulse sender for returning a warning signal over said connected calling one of said subscriber lines, means governed by operation of said counting mechanism to count a second fixed number of timed impulses sent from said impulse sender for operating said meter relay upon the next timed impulse sent from said impulse sender, said first fixed number being smaller than said second fixed number, and means governed jointly by said master controller in its heavy traffic setting and by operation of said answer relay for operating said meter relay upon the next timed impulse sent from said impulse sender.

6. In an automatic telephone system including a plurality of subscriber lines, a corresponding plurality of meters respectively individually associated with said subscriber lines, and a number of switching links for setting up connections from calling ones of said subscriber lines; an impulse sender common to said links and normally operative to send thereto both control impulses at a relatively slow timed rate and operate impulses at a relatively fast timed rate; a master controller common to said links and having light and medium and heavy traffic settings; means for selectively operating said master controller into different ones of its traffic settings; means governed by said master controller in its light traffic setting for blocking operation of said impulse sender to send control and operate impulses to said links; each of said links comprising an answer relay operative in response to the completion of a connection thereover from a connected calling one of said subscriber lines, a meter relay operative to operate the one of said meters individually associated with said connected calling one of said subscriber lines, counting mechanism, means governed jointly by said master controller in its medium traffic setting and by operation of said answer relay for operating said counting mechanism to count the control impulses sent from said impulse sender, means governed by operation of said counting mechanism to count a fixed number of said control impulses for operating said meter relay upon the next operate impulse sent from said impulse sender, and means governed jointly by said master controller in its heavy traffic setting and by operation of said answer relay for operating said meter relay upon the next operate impulse sent from said impulse sender.

References Cited in the file of this patent

UNITED STATES PATENTS

| Number | Name | Date |
|---|---|---|
| 2,225,386 | Hebel | Dec. 17, 1940 |
| 2,385,061 | Clark | Sept. 18, 1945 |
| 2,543,022 | Horwitz | Feb. 27, 1951 |
| 2,546,605 | Lomax | Mar. 27, 1951 |